Oct. 11, 1927.  1,644,889

G. O'B. MURPHY ET AL

CUTTING BLADE OF LAWN MOWER

Filed June 5, 1925

Inventors
Gilbert O'Byrne Murphy
and
Douglas Wenham
By
Pennie, Davis, Marvin & Edmonds
Attorneys Patented Oct. 11, 1927.

1,644,889

UNITED STATES PATENT OFFICE.

GILBERT O'BYRNE MURPHY AND DOUGLAS WENHAM, OF HAMILTON, NEW ZEALAND.

CUTTING BLADE OF LAWN MOWER.

Application filed June 5, 1925, Serial No. 35,068, and in New Zealand June 6, 1924.

This invention has reference to the ordinary cutter blades of lawn mowers across which the rotating knives pass in the operation of the mower so as to make a shearing cut therewith. These blades hitherto have generally been formed of inflexible metal strips so that in the adjustment of the blade with reference to the knives it has been difficult to obtain a correct adjustment owing to the unyielding nature of the blade.

In this invention this difficulty is overcome by the combination with the ordinary fixed blade and its holder frame, of a thin flexible steel blade that is gripped between the fixed blade and its holder, so that one edge projects beyond the edge of the fixed blade and forms a resilient cutting edge for the rotating knives to engage. This flexibility or resiliency will allow for the blade being adjusted close up to the knives and for its yielding when engaged thereby so that effective cutting is obtained.

A strip of rubber is arranged between the rigid blade and the flexible blade in order to cushion the latter and also to provide for unequal longitudinal tensioning of such flexible blade to meet any inequalities in the knives. This tensioning is obtained by the manipulation of screws by which the rigid blade is fastened to its frame holder and which screws clamp the two blades and the strip together.

The invention is illustrated in the accompanying drawings, in which:—

Figure 1:
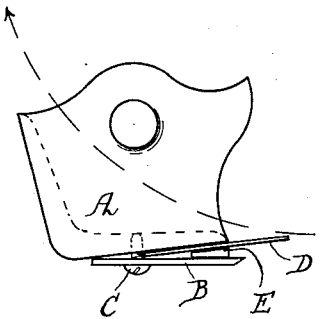
Figure 1 is an end elevation of the blade and its holder, which is of ordinary type.
Figure 2:
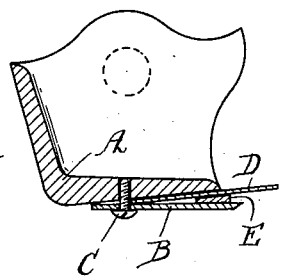
Figure 2 is a cross-sectional elevation thereof.
Figure 3:
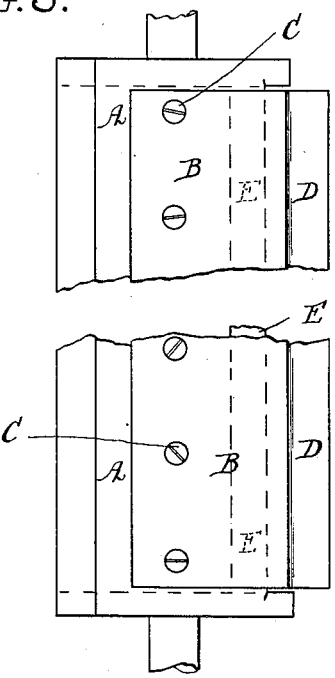
Figure 3 is an underneath plan thereof.

A represents the ordinary holder frame which is fitted in the mower in the usual way so that the rotating knives pass across it. B is the rigid blade that is secured to extend along the underside of the holder frame and to project beyond its front edge. This is fastened in position by means of screws C disposed at intervals apart in the length of the blade and passing through the blade and into the frame.

D is the thin flexible steel blade which is adapted to be positioned between the blade B and the frame by slipping one edge in between them while the screws C are loose, and is then gripped or clamped by tightening such screws. This blade is made of such a width that when its inner edge is inserted far enough to engage the screw stems, the outer edge will assume the proper cutting position with respect to the rotating knives. The knives thus pass across it to perform the cut and the springiness of the blade allows for its accurate adjustment without any impairing of efficiency in the cutting action.

E is the strip of rubber of approved thickness that is laid along between the rigid blade B and the flexible blade D and serves to cushion the latter upon the former. This strip is made of wedge shape in cross section so that it will fit neatly and form a firm seat for the flexible blade. The provision of the rubber strip also will allow of the flexible blade being variably set throughout its length to compensate for any inequalities in the knives, as by tightening the screws C more or less the tensional adjustment of the flexible blade is varied. The rubber at all times acts as a cushion and maintains evenly distributed contact with the flexible cutter.

The cutting blade formed by this flexible strip D, may be sharpened without detaching it from the machine and requires no skilled labour in sharpening. A fresh blade also may be placed in position at any time without much trouble.

In the drawings for the purpose of clearness of illustration a greater space is shown between the fixed and flexible blades than would be actually the case in practice.

We claim:—

In lawn mowers, the combination with a fixed blade and a holder frame therefor of a thin flexible blade gripped at one edge between them and projecting at its other edge beyond the fixed blade, and a strip of rubber disposed between the fixed and flexible blades, the whole being clamped together by screws passing through the fixed blade and into the holder frame, at intervals in its length, substantially as and for the purposes specified.

In testimony whereof, we affix our signatures.

GILBERT O'BYRNE MURPHY.
DOUGLAS WENHAM.